United States Patent
Jeon et al.

(10) Patent No.: US 10,390,022 B2
(45) Date of Patent: Aug. 20, 2019

(54) METHOD FOR PROCESSING VIDEO SIGNAL AND DEVICE THEREFOR

(71) Applicant: LG Electronics Inc., Seoul (KR)

(72) Inventors: Yongjoon Jeon, Seoul (KR); Seungwook Park, Seoul (KR); Eunyong Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 46 days.

(21) Appl. No.: 15/552,366

(22) PCT Filed: Mar. 16, 2016

(86) PCT No.: PCT/KR2016/002666
§ 371 (c)(1),
(2) Date: Aug. 21, 2017

(87) PCT Pub. No.: WO2016/148513
PCT Pub. Date: Sep. 22, 2016

(65) Prior Publication Data
US 2018/0048895 A1    Feb. 15, 2018

Related U.S. Application Data

(60) Provisional application No. 62/135,176, filed on Mar. 19, 2015.

(51) Int. Cl.
*H04N 19/159* (2014.01)
*H04N 19/105* (2014.01)
(Continued)

(52) U.S. Cl.
CPC ........ *H04N 19/159* (2014.11); *H04N 19/105* (2014.11); *H04N 19/119* (2014.11);
(Continued)

(58) Field of Classification Search
None
See application file for complete search history.

(56) References Cited

U.S. PATENT DOCUMENTS

2014/0086313 A1    3/2014  Zheng et al.
2016/0044327 A1*   2/2016  Kim ................. H04N 19/44
                                             382/233

FOREIGN PATENT DOCUMENTS

JP      2012-235280 A    11/2012
KR   10-2008-0060188 A    7/2008
(Continued)

*Primary Examiner* — Christopher G Findley
(74) *Attorney, Agent, or Firm* — Dentons US LLP

(57) ABSTRACT

The present invention relates to a method and a device for decoding a bitstream for a video signal, the method comprising the steps of: determining whether at least one neighboring block adjacent to a current block is divided into a plurality of coding blocks within a picture including the current block; if the at least one neighboring block is not divided, obtaining, from the bitstream, flag information indicating whether parameter information for the current block is induced from one of the at least one neighboring block, and inducing the parameter information for the current block from a specific neighboring block among the at least one neighboring block, on the basis of the flag information; obtaining the parameter information for the current block from the bitstream if all of the at least one neighboring block is divided; and decoding the current block on the basis of the parameter information for the current block.

15 Claims, 11 Drawing Sheets

(51) Int. Cl.
*H04N 19/139* (2014.01)
*H04N 19/167* (2014.01)
*H04N 19/176* (2014.01)
*H04N 19/196* (2014.01)
*H04N 19/70* (2014.01)
*H04N 19/119* (2014.01)
*H04N 19/96* (2014.01)
*H04N 19/463* (2014.01)

(52) U.S. Cl.
CPC ......... *H04N 19/139* (2014.11); *H04N 19/167* (2014.11); *H04N 19/176* (2014.11); *H04N 19/196* (2014.11); *H04N 19/197* (2014.11); *H04N 19/463* (2014.11); *H04N 19/70* (2014.11); *H04N 19/96* (2014.11)

(56) References Cited

FOREIGN PATENT DOCUMENTS

| | | |
|---|---|---|
| KR | 10-2010-0035243 A | 4/2010 |
| KR | 10-2014-0096008 A | 8/2014 |

\* cited by examiner

FIG. 4
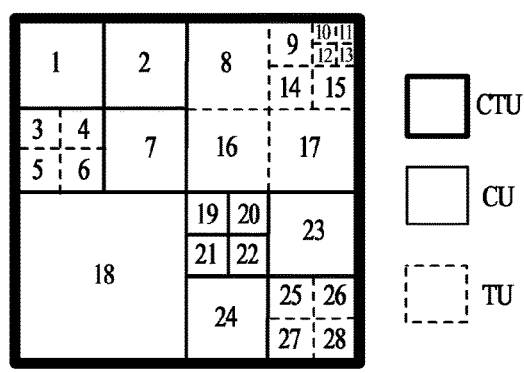
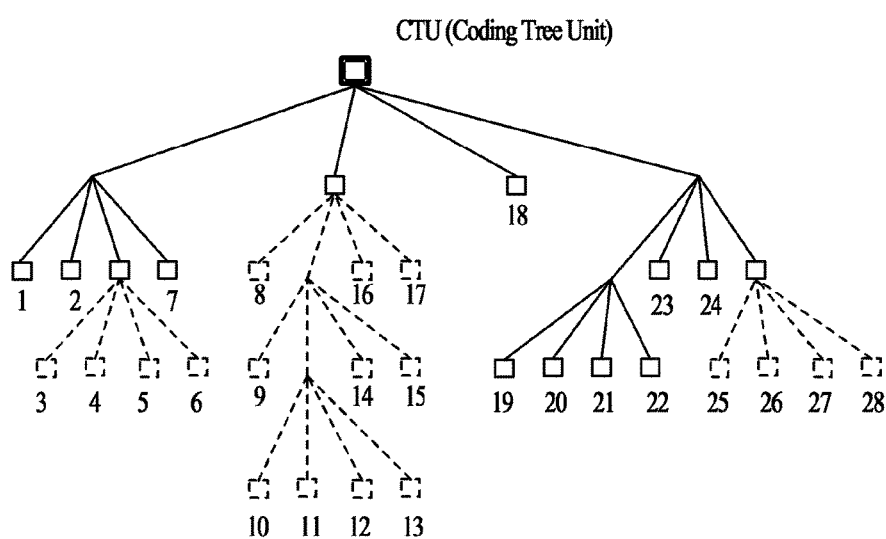

FIG. 9

LeftCtuNotSplitFlag = 1 if the left neighboring CTU is NOT split.
AboveCtuNotSplitFlag = 1 if the left neighboring CTU is NOT split.
CtuMergeDir = left or above, determined by the following pseudo code.

```
if( LeftCtuNotSplitFlag || AboveCtuNotSplitFlag ) {
    ctu_merge_flag
    if( !LeftCtuNotSplitFlag ) //left is split but not above
        CtuMergeDir = Above
    if( !AboveCtuNotSplitFlag ) //above is split but not left
        CtuMergeDir = Left
    if( LeftCtuNotSplitFlag && AboveCtuNotSplitFlag ) {//both are not split
        ctu_merge_from_left_flag
        CtuMergeDir = (ctu_merge_from_left_flag==1) ? Left : Above
    }
}
```

METHOD FOR PROCESSING VIDEO SIGNAL AND DEVICE THEREFOR

This application is a National Stage of International Application No. PCT/KR2016/002666, filed Mar. 16, 2016, which claims the benefit of U.S. Provisional Application Nos. 62/135,176, filed Mar. 19, 2015, all of which are hereby incorporated by reference in their entirety for all purposes as if fully set forth herein.

TECHNICAL FIELD

The present invention relates to video processing, and more specifically, relates to a method and apparatus for processing a video signal using merge between blocks.

BACKGROUND ART

In accordance with the rapid development of a digital video processing technology, a digital multimedia service using various media such as high-definition digital broadcasting, digital multimedia broadcasting, internet broadcasting and the like has been activated. As the high-definition digital broadcasting becomes common, various service applications have been developed and high-speed video processing techniques for video images of high quality and high definition are required. To this end, standards for coding video signals such as H.265/HEVC (High Efficiency Video Coding) and H.264/AVC (Advanced Video Coding) have been actively discussed.

DISCLOSURE OF THE INVENTION

Technical Tasks

One technical task of the present invention is to provide a method of efficiently processing a video signal and an apparatus therefor.

Another technical task of the present invention is to improve coding efficiency by reducing the number of bits required for coding of a video signal.

Still another technical task of the present invention is to improve coding efficiency by enabling a basic processing unit of video coding to be extended in a flexible manner.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a first aspect of the present invention, provided herein is a method of decoding a bitstream for a video signal by a decoding apparatus, the method comprising: determining whether at least one neighbor block adjacent to a current block within a picture including the current block is partitioned into a plurality of coding blocks, the at least one neighbor block including a left neighbor block and an upper neighbor block adjacent to the current block; when the at least one neighbor block is not partitioned, obtaining flag information from the bitstream, the flag information indicating whether parameter information for the current block is derived from one of the at least one neighbor block, and when the flag information indicates that the parameter information for the current block is derived from the at least one neighbor block, deriving the parameter information for the current block from a specific one of the at least one neighbor block; when all of the at least one neighbor block is partitioned, obtaining the parameter information for the current block from the bitstream; and decoding the current block based on the parameter information for the current block.

In a second aspect of the present invention, provided herein is a decoding apparatus configured to decode a bitstream for a video signal, the decoding apparatus comprising: a memory; and a processor operatively connected to the memory, wherein the processor is configured to: determine whether at least one neighbor block adjacent to a current block within a picture including the current block is partitioned into a plurality of coding blocks, the at least one neighbor block including a left neighbor block and an upper neighbor block adjacent to the current block; when the at least one neighbor block is not partitioned, obtain flag information from the bitstream, the flag information indicating whether parameter information for the current block is derived from one of the at least one neighbor block, and when the flag information indicates that the parameter information for the current block is derived from the at least one neighbor block, derive the parameter information for the current block from a specific one of the at least one neighbor block; when all of the at least one neighbor block is partitioned, obtain the parameter information for the current block from the bitstream; and decode the current block based on the parameter information for the current block.

Preferably, when the left neighbor block is partitioned, the specific neighbor block is determined as the right neighbor block.

Preferably, when the right neighbor block is partitioned, the specific neighbor block is determined as the left neighbor block.

Preferably, the method further comprises obtaining index information indicating one of the at least one neighbor block from the bitstream when the left neighbor block and the right neighbor block are not partitioned, wherein the specific neighbor block is determined as a block indicated by the index information among the at least one neighbor block.

Preferably, the at least one neighbor block further comprises upper-left and upper-right neighbor blocks adjacent to the current block within the picture including the current block and a block located at a position corresponding to the current block in a picture different from the picture including the current block.

Preferably, the method further comprises obtaining index information indicating one of the at least one neighbor block from the bitstream when the flag information indicates that the parameter information for the current block is derived from the at least one neighbor block, wherein the specific neighbor block is determined as a block indicated by the index information among the at least one neighbor block.

Preferably, the parameter information for the current block comprises information indicating whether the current block is partitioned into a plurality of coding blocks having a half horizontal size and a half vertical size, and information indicating whether the current block or each coding block included in the current block is coded in intra prediction mode or inter prediction mode.

Preferably, the parameter information for the current block comprises information related to an intra prediction mode for the current block or each coding block included in the current block.

Preferably, the parameter information for the current block comprises inter prediction parameter information for the current block or each prediction block included in the current block, and wherein the inter prediction parameter information comprises reference picture index information and motion vector information.

Preferably, for the current block or each block included in the current block, decoding the current block comprises obtaining coded block flag information from the bitstream, the coded block flag information indicating whether a corresponding block includes a non-zero transform coefficient, obtaining transform coefficient information for the corresponding block from the bitstream based on the coded block flag information, and obtaining a residual for the corresponding block from the transform coefficient information.

Preferably, the picture comprises a plurality of blocks each of which has a same size as the current block, and the method further comprises performing the steps for each of the plurality of blocks.

Preferably, the method further comprises obtaining information indicating a minimum size of a coding block from the bitstream; obtaining information indicating a difference between the minimum size of the coding block and a maximum size of the coding block from the bitstream; and determining a size of the current block using the information indicating the minimum size of the coding block and the information indicating the difference.

Preferably, deriving the parameter information for the current block from the specific neighbor block includes setting parameter information of the specific neighbor block as the parameter information for the current block.

Preferably, the coding block indicates a unit for applying a same intra prediction mode or inter prediction mode.

Advantageous Effects

According to the present invention, a video signal can be efficiently processed.

Further, according to the present invention, coding efficiency can be improved by reducing the number of bits required for coding of a video signal.

Further, according to the present invention, coding efficiency can be improved by enabling a basic processing unit of video coding to be extended in a flexible manner.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention.

FIG. 4 illustrates an example of partitioning a CTU by a quadtree scheme.

FIG. 9 illustrates an embodiment of a CTU merge mode according to the present invention.

BEST MODE FOR INVENTION

Figure 1:
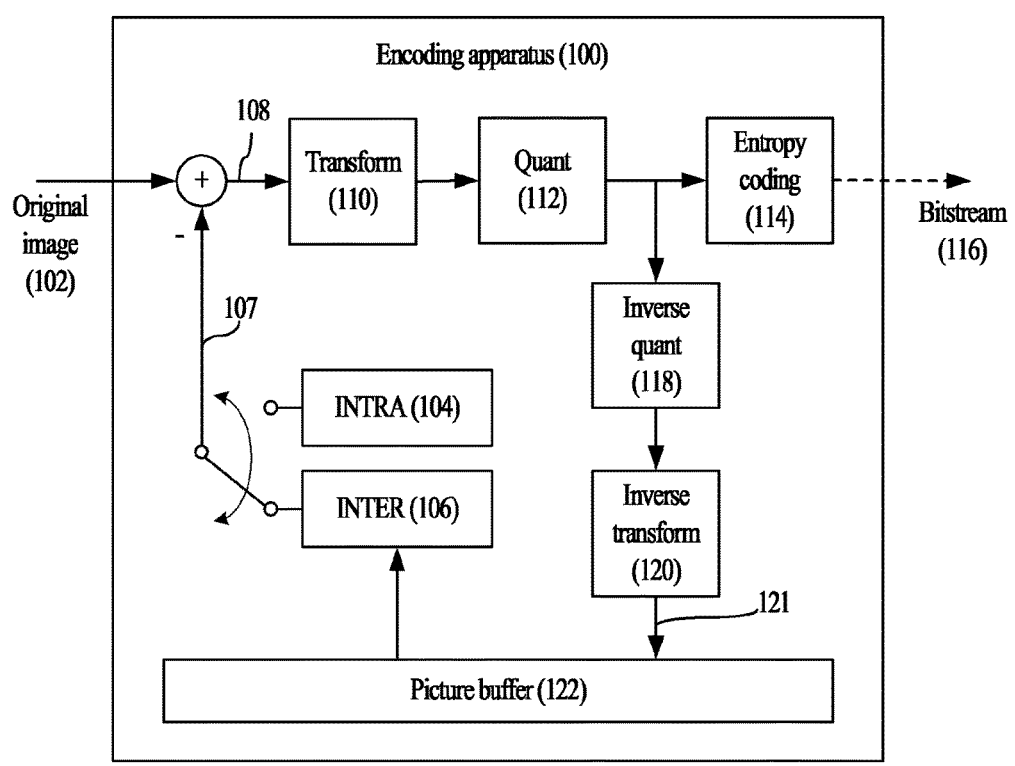
FIG. 1 illustrates an encoding procedure.

A technology described in the following can be used for an image signal processing apparatus configured to encode and/or decode a video signal. Generally, a video signal corresponds to an image signal or a sequence of pictures capable of being recognized by eyes. Yet, in the present specification, the video signal can be used for indicating a sequence of bits representing a coded picture or a bit stream corresponding to a bit sequence. A picture may indicate an array of samples and can be referred to as a frame, an image, or the like. More specifically, the picture may indicate a two-dimensional array of samples or a two-dimensional sample array. A sample may indicate a minimum unit for constructing a picture and may be referred to as a pixel, a picture element, a pel, or the like. The sample may include a luminance (luma) component and/or a chrominance (chroma, color difference) component. In the present specification, coding may be used to indicate encoding or may commonly indicate encoding/decoding.

A picture may include at least one or more slices and a slice may include at least one or more blocks. The slice can be configured to include the integer number of blocks for purposes such as parallel processing, resynchronization of decoding when a bit stream is damaged due to data loss, and the like. Each slice can be independently coded. A block may include at least one or more samples and may indicate an array of samples. A block may have a size equal to or a less than a size of a picture. A block may be referred to as a unit. A currently coded picture may be referred to as a current picture and a block currently being coded may be referred to as a current block. There may exist various block units constructing a picture. For example, in case of ITU-T H.265 standard (or High Efficiency Video Coding (HEVC) standard), there may exist such a block unit as a coding tree block (CTB) (or a coding tree unit (CTU)), a coding block (CB) (or a coding unit (CU)), a prediction block (PB) (or a prediction unit (PU)), a transform block (TB) (or a transform unit (TU)), and the like.

The coding tree block corresponds to the most basic unit for constructing a picture and can be divided into coding blocks of a quad-tree form to improve coding efficiency according to texture of a picture. The coding block may correspond to a basic unit for performing coding and intra-coding or inter-coding can be performed in a unit of the coding block. The intra-coding is to perform coding using intra prediction and the intra prediction is to perform prediction using samples included in the same picture or slice. The inter-coding is to perform coding using inter prediction and the inter prediction is to perform prediction using samples included in a picture different from a current picture. A block coded using the intra-coding or coded in an intra prediction mode may be referred to as an intra block, and a block coded using the inter-coding or coded in an inter prediction mode may be referred to as an inter block. And, a coding mode using intra prediction can be referred to as an intra mode, and a coding mode using inter prediction can be referred to as an inter mode.

The prediction block may correspond to a basic unit for performing prediction. Identical prediction can be applied to a prediction block. For example, in case of the inter prediction, the same motion vector can be applied to one prediction block. The transform block may correspond to a basic unit for performing transformation. The transformation may correspond to an operation of transforming samples of a pixel domain (or a spatial domain or a time domain) into a conversion coefficient of a frequency domain (or a transform coefficient domain), or vice versa. In particular, an operation of converting a conversion coefficient of the frequency domain (or transform coefficient domain) into samples of the pixel domain (or spatial domain or time domain) can be referred to as inverse transformation. For example, the transformation may include discrete cosine transform (DCT), discrete sine transform (DST), a Fourier transform, and the like.

In the present specification, a coding tree block (CTB) may be interchangeably used with a coding tree unit (CTU), a coding block (CB) may be interchangeably used with a coding unit (CU), a prediction block (PB) may be interchangeably used with a prediction unit (PU), and a transform block (TB) may be interchangeably used with a transform unit (TU).

FIG. 1 illustrates an encoding procedure.

An encoding apparatus 100 receives an input of an original image 102, performs encoding on the original image, and outputs a bit stream 114. The original image 102 may correspond to a picture. Yet, in the present example, assume that the original image 102 corresponds to a block for constructing a picture. For example, the original image 102 may correspond to a coding block. The encoding apparatus 100 can determine whether the original image 102 is coded in intra mode or inter mode. If the original image 102 is included in an intra picture or a slice, the original image 102 can be coded in the intra mode only. However, if the original image 102 is included in an inter picture or a slice, for example, it is able to determine an efficient coding method in consideration of RD (rate-distortion) cost after the intra-coding and the inter-coding are performed on the original image 102.

In case of performing the intra-coding on the original image 102, the encoding apparatus 100 can determine an intra-prediction mode showing RD optimization using reconstructed samples of a current picture including the original image 102 (104). For example, the intra-prediction mode can be determined by one selected from the group consisting of a direct current (DC) prediction mode, a planar prediction mode and an angular prediction mode. The DC prediction mode corresponds to a mode in which prediction is performed using an average value of reference samples among reconstructed samples of a current picture, the planar prediction mode corresponds to a mode in which prediction is performed using bilinear interpolation of reference samples, and the angle prediction mode corresponds to a mode in which prediction is performed using a reference sample located in a specific direction with respect to the original image 102. The encoding apparatus 100 can output a predicted sample or a prediction value (or predictor) 107 using the determined intra prediction mode.

When the inter-coding is performed on the original image 102, the encoding apparatus 100 performs motion estimation (ME) using a reconstructed picture included in a (decoded) picture buffer 122 and may be then able to obtain motion information (106). For example, the motion information can include a motion vector, a reference picture index, and the like. The motion vector may correspond to a two-dimensional vector that provides an offset from a coordinate of the original image 102 to a coordinate in a reference picture in a current picture. The reference picture index may correspond to an index for a list of reference pictures (or a reference picture list) used for inter prediction among the reconstructed pictures stored in the (decoded) picture buffer 122. The reference picture index indicates a corresponding reference picture. The encoding apparatus 100 can output a predicted sample or a predicted value 107 using the obtained motion information.

Subsequently, the encoding apparatus 100 can generate a residual data 108 from a difference between the original image 102 and the predicted sample 107. The encoding apparatus 100 can perform a transformation on the generated residual data 108 (110). For example, Discrete Cosine Transform (DCT), Discrete Sine Transform (DST), and/or wavelet transform can be applied for the transformation. More specifically, it may use an integer-based DCT having a size of 4×4 to 32×32 and 4×4, 8×8, 16×16, and 32×32 transforms can be used. The encoding apparatus 100 performs transformation 110 to obtain transform coefficient information.

The encoding apparatus 100 quantizes the transform coefficient information to generate quantized transform coefficient information (112). Quantization may correspond to an operation of scaling a level of the transform coefficient information using a quantization parameter (QP). Hence, the quantized transform coefficient information may be referred to as scaled transform coefficient information. The quantized transform coefficient information can be output as a bit stream 116 via entropy coding 114. For example, the entropy coding 114 can be performed based on fixed length coding (FLC), variable length coding (VLC), or arithmetic coding. More specifically, it may apply context adaptive binary arithmetic coding (CABAC) based on arithmetic coding, Exp-Golomb coding based on variable length coding, and fixed length coding.

And, the encoding apparatus 100 performs inverse quantization 118 and inverse transformation 120 on the quantized transform coefficient information to generate a reconstructed sample 121. Although it is not depicted in FIG. 1, in-loop filtering can be performed on a reconstructed picture after obtaining the reconstructed picture by acquiring the reconstructed sample 121 for a picture. For the in-loop filtering, for example, it may apply a deblocking filter, a sample adaptive offset (SAO) filter. Subsequently, the reconstructed picture 121 is stored in the picture buffer 122 and can be used for encoding a next picture.

Figure 2:
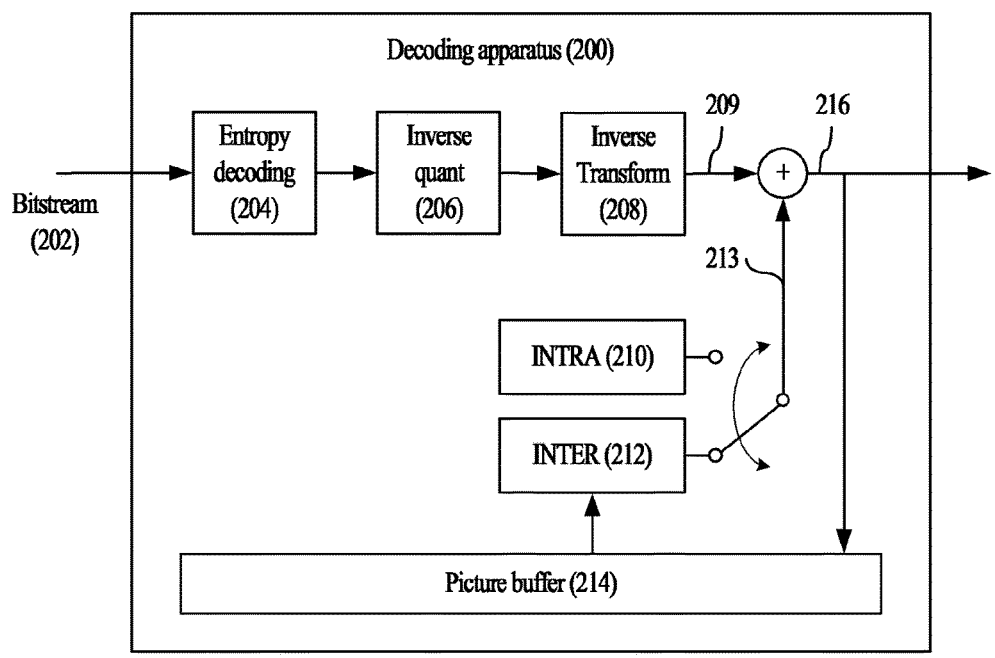
FIG. 2 illustrates a decoding procedure.

FIG. 2 illustrates a decoding procedure.

A decoding apparatus 200 receives a bit stream 202 and can perform entropy decoding 204. The entropy decoding 204 may correspond to a reverse operation of the entropy coding 114 mentioned earlier in FIG. 1. The decoding apparatus 200 can obtain data and (quantized) transform coefficient information necessary for decoding by including prediction mode information, intra prediction mode information, motion information, and the like through the entropy decoding 204. The decoding apparatus 200 can generate a residual data 209 by performing inverse quantization 206 and inverse transformation 208 on the obtained transform coefficient information.

The prediction mode information obtained through the entropy decoding 204 can indicate whether a current block is coded in intra mode or inter mode. If the prediction mode information indicates the intra mode, the decoding apparatus 200 can obtain a prediction sample (or prediction value) 213 from reconstructed samples of a current picture based on the intra prediction mode obtained through the entropy decoding 204 (210). If the prediction mode information indicates the inter mode, the decoding apparatus 200 can obtain a prediction sample (or prediction value) 213 from a reference picture stored in the picture buffer 214 based on the motion information obtained through the entropy decoding 204 (212).

The decoding apparatus 200 can obtain a reconstructed sample 216 for the current block using the residual data 209 and the prediction sample (or prediction value). Although it is not depicted in FIG. 2, in-loop filtering can be performed on a reconstructed picture after the picture is reconstructed by obtaining the reconstructed sample 216 for a picture. Subsequently, the reconstructed picture 216 can be stored in the picture buffer to decode a next picture or can be outputted for display.

A video encoding/decoding process requires very high complexity for software/hardware (SW/HW) processing. Hence, in order to perform a job of high complexity using a limited resource, it is able to process a picture (or video) in a manner of partitioning it by a basic processing unit that is a minimum processing unit. Thus, one slice may include at least one basic processing unit. In this case, a basic processing unit included in one picture or slice may have a same size.

In case of HEVC (High Efficiency Video Coding) standard (ISO/IEC 23008-2 or ITU-T H.265), as described above, a basic processing unit may be named CTB (Coding Tree Block) or CTU (Coding Tree Unit) and have a size of 64×64 pixels. Hence, in case of the HEVC standard, a single picture can be encoded/decoded in a manner of being divided by CTU that is a basic processing unit. For detailed example, in case of encoding/decoding 8192×4096 picture, it is able to perform an encoding procedure shown in FIG. 1 or a decoding procedure shown in FIG. 2 on 8,192 CTUs resulting from dividing a picture into the 8,192 CTUs (=128×64).

A video signal or bitstream may include a sequence parameter set (SPS), a picture parameter set (PPS), at least one access unit. The sequence parameter set includes parameter information (of pictures) in a sequence level, and the parameter information of the sequence parameter set may be applied to each picture in a sequence of pictures. The picture parameter set includes parameter information in a picture level, and information of the picture parameter set may be applied to each slice included in a picture. The access unit refers to a unit corresponding to one picture, and may include at least one slice. A slice may include an integer number of CTUs. Syntax information refers to data included in a bitstream, and a syntax structure refers to a structure of syntax information which is present in a bistream in a specific order.

A size of a coding tree block may be determined using parameter information of SPS. The SPS may include first information indicating the minimum size of a coding block and second information indicating a difference between the minimum size of the coding block and the maximum size of the coding block. Generally, the size of a block may be represented by a power of 2, and thus each information may be represented as a log 2 value of an actual value. Thus, a log 2 value of the minimum size of the coding block may be obtained by adding a specific offset (e.g. 3) to a value of the first information, and a log 2 value of the size of a coding tree block may be obtained by adding a value of the second information to a log 2 value of the minimum size of the coding block. The size of the coding tree block may be obtained by left shifting 1 by the log 2 value.

Figure 3:
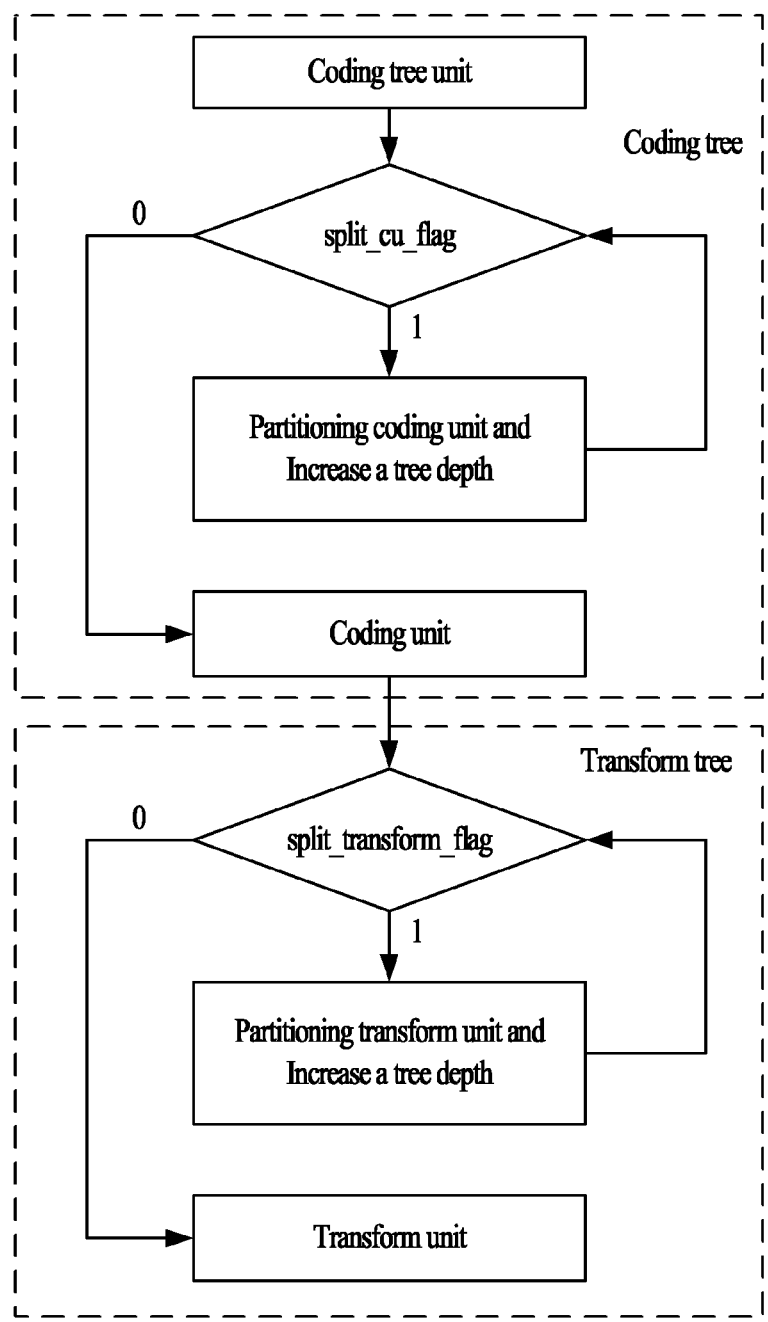
FIG. 3 illustrates a flow chart for a method of partitioning a coding tree unit (CTU).

FIG. 3 illustrates a flow chart for a method of partitioning a coding tree unit (CTU).

In the HEVC standard, unlike the existing video coding standards (e.g., VC-1, AVC), for the compression efficiency enhancement, after partitioning CTU into at least one coding unit (CU) by a quadtree scheme, an intra or inter prediction mode can be determined for a coding block (or coding unit). If CTU is not partitioned, the CTU may correspond to a CU. In this case, the CU may have the same size of the CTU, and an intra or inter prediction mode can be determined for the corresponding CTU.

When a CTU is partitioned by a quadtree scheme, it may be partitioned recursively. After a CTU has been partitioned into 4 units, each of the units may be partitioned again into subunits by a quadtree scheme in addition. Each unit finally generated by recursively partitioning a CTU by a quadtree scheme may become a coding unit. For example, after a CTU has been partitioned into first to fourth blocks, if the first block is partitioned into fifth to eighth blocks but the second to fourth blocks are not partitioned, the second to eighth blocks can be determined as coding blocks. In this example, an intra or inter prediction mode may be determined for each of the second to eighth blocks.

Whether a CTU is partitioned into a coding unit may be determined by an encoder side in consideration of RD (rate distortion) efficiency, and information indicating a presence or non-presence of partition may be included in a bitstream. For example, information indicating whether a CTU or a coding unit is partitioned into a coding unit having a half horizontal/vertical size may be named split_cu_flag in HEVC standard. Information indicating whether a block is partitioned within a CTU may be called a partition indication information for a coding unit. A decoder side determines whether to partition a coding unit by obtaining information indicating a presence or non-presence of partition for each coding unit within a coding quadtree from a bitstream and is able to partition the coding unit recursively by a quadtree scheme. A coding tree or coding quad tree refers to a tree structure of coding units formed by recursively partitioning a CTU. If each coding unit is not partitioned anymore within a coding tree, the corresponding unit may be finally referred to as a coding unit.

As described above, a coding unit can be partitioned into at least one prediction unit to perform a prediction. Moreover, a coding unit can be partitioned into at least one transform unit to perform a transformation. In a manner similar to that of a CTU, a coding unit may be recursively partitioned into a transform unit by a quadtree scheme. A structure formed by partitioning a coding unit by a quadtree scheme may be called a transform tree or a transform quad tree, and information indicating whether each unit is partitioned within a transform tree may be included in a bitstream, which is similar to the partition indication information. For example, information indicating whether a unit is partitioned into a unit having a half horizontal/vertical size for a transformation in HEVC standard may be called split_transform_flag. Information indicating whether each unit is partitioned in a transform tree may be called partition indication information for a transform unit.

FIG. 4 illustrates an example of partitioning a CTU by a quadtree scheme.

Referring to FIG. 4, a CTU may be partitioned into a first coding unit containing blocks 1 to 7, a second coding unit containing blocks 8 to 17, a third coding unit corresponding to a block 18, and a fourth coding unit containing blocks 19 to 28. The first coding unit may be partitioned into a coding unit corresponding to the block 1, a coding unit corresponding to the block 2, a fifth coding unit containing the blocks 3 to 6, and a coding unit corresponding to the block 7. The second coding unit may be partitioned into additional transform units for transformation despite failing to be further partitioned within a coding quadtree. The fourth coding unit may be partitioned into a sixth coding unit containing the blocks 19 to 22, a coding unit corresponding to the block 23, a coding unit corresponding to the block 24, and a seventh coding unit containing the blocks 25 to 28. The sixth coding unit may be partitioned into a coding unit corresponding to the block 19, a coding unit corresponding to the block 20, a coding unit corresponding to the block 21, and a coding unit corresponding to the block 22. And, the seventh coding unit may be partitioned into additional transform units for transformation despite failing to be further partitioned within a coding quadtree.

As described above, information (e.g., split_cu_flag) indicating a presence or non-presence of partition for a CTU or each coding unit may be included in a bitstream. If the information indicating a presence or non-presence of partition has a first value (e.g., 1), the CTU or each coding unit can be partitioned. If the information indicating a presence or non-presence of partition has a second value (e.g., 0), the CTU or each coding unit is not partitioned. And, a value of the information indicating a presence or non-presence of partition may vary.

In the example shown in FIG. 4, the partition indication information (e.g., split_cu_flag) for the CTU, the first coding unit, the fourth coding unit and the sixth coding unit may have the first value (e.g., 1). A decoder obtains partition indication information on the corresponding unit from the bitstream and is then able to partition the corresponding unit into 4 subunits. On the other hand, the partition indication information (e.g., split_cu_flag) for other coding units (coding units corresponding to block 1, block 2, block 7, blocks 18 to 23, and blocks 3 to 6, coding units corresponding to blocks 8 to 17, and coding units corresponding to blocks 25 to 28) may have the second value (e.g., 0). The decoder obtains the partition indication information on the corresponding unit from the bitstream and does not further partition the corresponding unit according to this value.

As described above, each coding unit may be partitioned into at least one transform unit by a quadtree scheme according to partition indication information for a transform unit for transformation. Referring now to FIG. 4, since a coding unit corresponding to the blocks 1, 2, 7 and 18 to 24 is not partitioned for transformation, a transform unit may correspond to a coding unit but another coding unit (a coding unit corresponding to the blocks 3 and 4, 8 to 17, or 25 to 28) may be additionally partitioned for transformation. Partition indication information (e.g., split_transform_flag) for each unit within a transform tree formed from each coding unit (e.g., a coding unit corresponding to the blocks 3, 4, 8 to 17, or 25 to 28) and the corresponding coding unit can be partitioned into a transform unit according to a value of the partition indication information. As shown in FIG. 4 exemplarily, a coding unit corresponding to the blocks 3 to 6 may be partitioned into transform units to form a transform tree of depth 1, a coding unit corresponding to the blocks 8 to 17 may be partitioned into transform units to form a transform tree having depth 3, and a coding unit corresponding to the blocks 25 to 28 may be partitioned into transform units to form a transform tree having depth 1.

Figure 5:
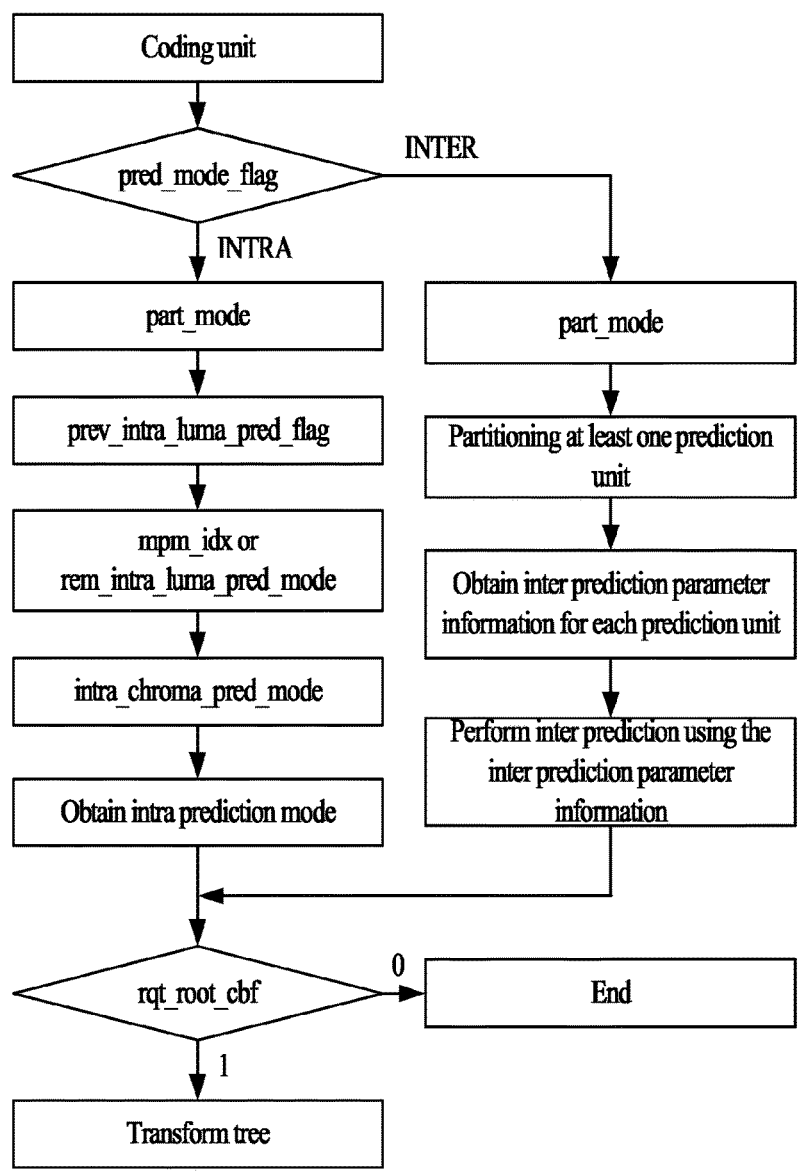
FIG. 5 illustrates an example of syntax information and operations for a coding unit.
Figure 6:
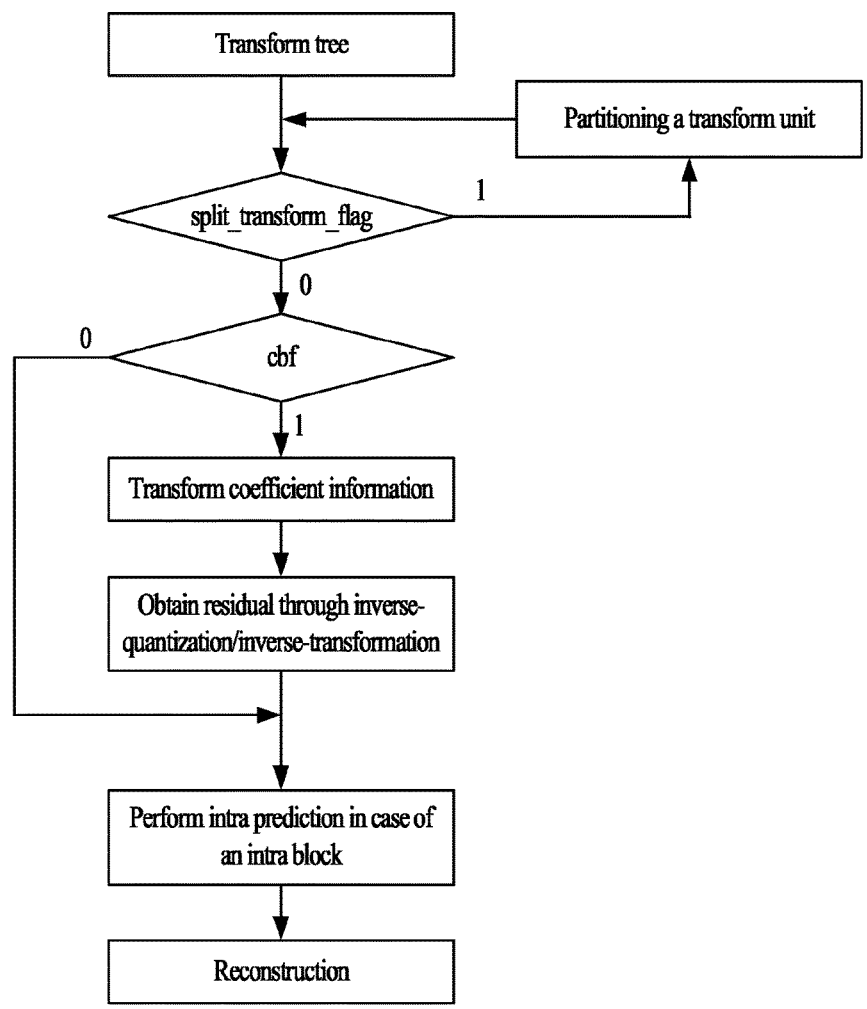
FIG. 6 illustrates an example of syntax information and operations for a transform tree.

FIG. 5 shows one example of syntax information and operations for a coding unit, and FIG. 6 shows one example of syntax information and operations for a transform tree. As exemplarily shown in FIG. 5, information indicating whether a transform tree structure of a current coding unit exists can be signaled through a bitstream. In the present specification, such information may be called transform tree coding indication information or rgt_root_cbf. A decoder obtains the transform tree coding indication information from the bitstream. If the transform tree coding indication information indicates that a transform tree for a corresponding coding unit exists, the decoder can perform the operation shown in FIG. 6. If the transform tree coding indication information indicates that the transform tree for the corresponding coding unit does not exist, transform coefficient information for the corresponding coding unit does not exist and the coding unit can be reconstructed using a prediction value (intra or inter prediction value) for the corresponding coding unit.

A coding unit is a basic unit for determining whether it is coded in intra or inter prediction mode. Hence, prediction mode information for each coding unit can be signaled through a bitstream. The prediction mode information may indicate whether the corresponding coding unit is coded using an intra prediction mode or an inter prediction mode.

If the prediction mode information indicates that the corresponding coding unit is coded in the intra prediction mode, informations used in determining the intra prediction mode can be signaled through the bitstream. For example, the information used in determining the intra prediction mode may include intra prediction mode reference information. The intra prediction mode reference information indicates whether an intra prediction mode of a current coding unit is derived from a neighbor (prediction) unit, and may be referred to as prev_intra_luma_pred_flag for example.

If the intra prediction mode reference information indicates whether the intra prediction mode of the current coding unit is derived from the neighbor (prediction) unit, an intra prediction mode candidate list is configured using an intra prediction mode of the neighbor unit and index information indicating an intra prediction mode of the current unit in the configured candidate list can be signaled through the bitstream. For example, index information indicating a candidate intra prediction ode used as the intra prediction mode of the current unit in the intra prediction mode candidate list may be named mpm_idx. The decoder obtains the intra prediction mode reference information from the bitstream and may obtain the index information from the bitstream based on the obtained intra prediction mode reference information. Moreover, the decoder may set the intra prediction mode candidate indicated by the obtained index information as the intra prediction mode of the current unit.

If the intra prediction mode reference information does not indicate that the intra prediction mode of the current coding unit is not derived from the neighbor unit, information indicating the intra prediction mode of the current unit can be signaled through the bitstream. The information signaled through the bitstream may be named rem_intra_luma_pred_mode for example. The information obtained from the bitstream is compared with values of candidates in the intra prediction mode candidate list. If the obtained information is equal to or greater than the values, the intra prediction mode of the current unit can be obtained by an operation of increment by a specific value (e.g., 1).

If a picture contains a chroma component (or color difference component), information indicating an intra prediction mode for a chroma coding block may be signaled through a bitstream. For example, information indicating a chroma intra prediction mode can be named intra_chroma_pred_mode. The chroma intra prediction mode can be obtained based on Table 1 using the information indicating the chroma intra prediction mode and the intra prediction mode obtained as described above (or the luma intra prediction mod). In Table 1, IntraPredModeY indicates the luma intra prediction mode.

TABLE 1

| | IntraPredModeY | | | | |
|---|---|---|---|---|---|
| intra_chroma_pred_mode | 0 | 26 | 10 | 1 | X(0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

An intra prediction mode indicates various prediction odes according to values. A value of an intra prediction mode may correspond to an intra prediction mode, as shown in Table 2, through the aforementioned process.

TABLE 2

| Intra prediction mode | Associated name |
|---|---|
| 0 | INTRA_PLANAR |
| 1 | INTRA_DC |
| 2.34 | INTRA_ANGULAR2_INTRA_ANGULAR34 |

In Table 2, INTRA_PLANAR indicates a planar prediction mode and also indicates a mode for obtaining a prediction value of a current block by performing an interpolation on a reconstructed sample of an upper neighbor block adjacent to a current block, a reconstructed sample of a left neighbor block, a reconstructed sample of a lower-left neighbor block, and a reconstructed sample of a right-upper neighbor block. INTRA_DC indicates a DC (Direct Current) prediction mode, and also indicates a mode for obtaining a prediction value of a current block using averages of the reconstructed samples of left neighbor block and the reconstructed samples of upper neighbor block. INTRA_ANGULAR2 to INTRA_ANGULAR34 indicate angular prediction mode, and also indicate a mode for finding a prediction value of a current sample using a reconstructed sample of a neighbor block located in a direction of a specific angle for a current sample within a current block. If a real sample fails to exist in the direction of the specific angle, it is able to find a prediction value in a manner of generating a virtual sample for the corresponding direction by performing an interpolation on neighbor reconstructed samples.

An intra prediction mode may be found per coding unit. Yet, intra prediction may be performed by a unit of a transform unit. Hence, the aforementioned reconstructed sample of the neighbor block may refer to a reconstructed sample existing within a neighbor block of a current transform block. After finding a prediction value for a current block using an intra prediction mode, it is able to find a difference between the sample value of the current block and the prediction value. The difference between the sample value of the current block and the prediction value may be named a residual (or residual information or residual data). A decoder side obtains transform coefficient information on the current block from a bitstream and is then able to find a residual by performing dequantization and inverse transform on the obtained transform coefficient information. Dequantization may refer to scaling a value of transform coefficient information using a quantization parameter (QP). Since a transform unit is a basic unit for performing a transform, transform coefficient information can be signaled through a bitstream by a unit of the transform unit.

In case of performing an intra prediction, a residual may be 0. For example, if a sample of a current block is identical to a reference sample for intra prediction, a value of a residual may be 0. If a residual value for a current block is 0 all, since a value of transform coefficient information is 0 all, it is not necessary to signal the transform coefficient information through a bitstream. Hence, information indicating whether transform coefficient information for a corresponding block is signaled through a bitstream can be signaled through a bitstream. Information indicating whether a corresponding transform block has transform coefficient information that is not 0 refers to coded block indication information or coded block flag information, and may be named cbf in the present specification. Coded block indication information for a luma component may be named cbf_luma and coded block indication information for a chroma component may be named cbf_cr or cbf_cb. The decoder obtains coded block indication information for a corresponding transform block from a bitstream. If the coded block indication information indicates that the corresponding block contains transform coefficient information that is not 0, the decoder obtains the transform coefficient information for the corresponding transform block from the bitstream and is also able to obtain a residual through dequantization and inverse transform.

If a current coding block is coded in intra prediction mode, the decoder finds a prediction value for the current coding block by finding a prediction value by transform block unit and/or may find a residual for the current coding block by finding a residual by transform block unit. The decoder can reconstruct the current coding block using the prediction value and/or residual for the current coding block.

As a transform/inverse transform scheme, a discrete cosine transform (DCT) is used popularly. Transform bases for DCT may be approximated in integer form for small memory and fast operation. Transform bases approximated into integers can be represented as a matrix form. And, the transform bases represented in matrix form may be named a transform matrix. In the H.265/HEVC standard, integer transforms in 4×4 to 32×32 sizes are used and a 4×4 or 32×32 transform matrix is provided. The 4×4 transform matrix may be used for 4×4 transform/inverse transform, and the 32×32 transform matrix may be used for 8×8, 16×16, or 32×32 transform/inverse transform.

Meanwhile, if prediction mode information for a current coding block indicates that a current coding block is coded using inter prediction, information indicating a partitioning mode of the current coded coding can be signaled through a bitstream. The information indicating the partitioning mode of the current coding block may be represented as part_mode for example. If the current coding block is coded using inter prediction, the current coding block can be partitioned into at least one prediction block according to the partitioning mode of the current coding block.

For example, assuming that a current coding block is 2N×2N block, partitioning modes may include PART_2N×2N, PART_2N×N, PART_N×2N, PART_2N×nU, PART_2N+nD, PART_nL×2N, PART_nR×2N, and PART_N×N. PART_2N×2N indicates a mode that a current coding block is equal to a prediction block. PART_2N×N indicates a mode that a current coding block is partitioned into 2 2N×N prediction blocks. PART_N×2N indicates that a current coding block is partitioned into 2 N×2N prediction blocks. PART_2N+nU indicates a mode that a current coding block is partitioned into an upper 2N+n prediction block and a lower 2N×(N−n) prediction block. PART_2N+nD indicates a mode that a current coding block is partitioned into an upper 2N×(N−n) prediction block and a lower 2N+n prediction block. PART_nL×2N indicates a mode that a current coding block is partitioned into a left n×2N prediction block and a right (N−n)×2N prediction block. PART_nR×2N indicates a mode that a current coding block is partitioned into a left (N−n)×2N prediction block and a right n×2N prediction block. PART_N×N indicates a mode that a current coding block is partitioned into 4 N×N prediction blocks. For example, n is N/2.

Even if a current coding block is in intra coding mode, part_mode can be signaled through a bitstream. Yet, when a current coding block is in intra coding mode, only if a size of the current coding block is a minimum size of a coding block, part_mode is signaled. And, it is able to indicate whether the current coding block is additionally partitioned into 4 blocks.

A prediction unit is a unit for performing motion estimation and motion compensation. Hence, inter prediction parameter information can be signaled through a bitstream by a unit of a prediction unit. The inter prediction parameter information may include reference picture information, motion vector information and the like for example. The inter prediction parameter information may be derived from a neighbor unit or signaled through a bitstream. A case of deriving the inter prediction parameter information from the neighbor unit is named a merge mode. Hence, information indicating whether inter prediction parameter information for a current prediction unit is derived from a neighbor unit can be signaled through a bitstream. And, the corresponding information may refer to merge indication information or merge flag information. The merge indication information may be represented as merge_flag.

If a merge indication mode indicates that inter prediction parameter information of a current prediction unit is derived from a neighbor unit, a merge candidate list is configured using the neighbor unit, information indicating a merge candidate to derive the inter prediction parameter information of the current unit in the merge candidate list can be signaled through a bitstream, and the corresponding information may be named merge index information. For example, the merge index information may be represented as merge_idx. Neighbor blocks may include spatial neighbor blocks including a left neighbor block adjacent to a current block, an upper neighbor block, an upper-left neighbor block, a lower-left neighbor block, and an upper-right neighbor block in a picture including the current block and a temporal neighbor block located (or co-located) at a position corresponding to the current block in a picture different from the picture including the current block. The decoder may configure a merge candidate list using the neighbor blocks, obtain merge index information from the bitstream, and set inter prediction parameter information of a neighbor block indicated by the merge index information in the merge candidate list as inter prediction parameter information of the current block.

Meanwhile, when a prediction block corresponds to a coding block, as a result of performing inter prediction on the prediction block, if inter prediction information is identical to a specific neighbor block and residual is 0 all, it is not necessary to signal the inter prediction parameter information, transform coefficient information and the like through a bitstream. In this case, since the inter prediction parameter information for a coding block can be just derived from a neighbor block, a merge mode is applicable. Hence, in case that a corresponding coding block is coded using inter prediction, only merge index information can be signaled through a bitstream for the corresponding coding block. Such a mode is named a merge skip mode. Namely, in the merge skip mode, syntax information for a coded lock is not signaled except merge index information (e.g., merge_idx). Yet, in order to indicate that it is unnecessary to further obtain syntax information except the merge index information (e.g., merge_idx) for the corresponding coding block, skip flag information may be signaled through a bitstream. In the present specification, the skip flag information may be named cu_skip_flag. The decoder obtains skip flag information for the coding block from a slice not in intra coding mode and is able to reconstruct the coding block in the merge skip mode according to the skip flag information.

If a merge indication mode does not indicate that inter prediction parameter information of a current prediction block is derived from a neighbor block, an inter prediction parameter of a current prediction block may be signaled through a bitstream. Reference index information for a reference picture list 0 and/or reference index information for a reference picture list 1 can be signaled through a bitstream depending on whether it is L0 and/or L1 prediction of the current prediction block. Regarding motion vector information, information indicating a motion vector difference and information indicating a motion vector prediction value (predictor) can be signaled through a bitstream. The information indicating the motion vector predictor is index information indicating a candidate used as a motion vector prediction value of a current block in a motion vector predictor candidate list configured with motion vectors of neighbor blocks, and may be named motion vector predictor indication information. The motion vector predictor indication information may be represented as mvp_l0_flag or mvp_l1_flag for example. The decoder obtains a motion vector predictor based on motion vector predictor indication information, finds a motion vector difference by obtaining information related to a motion vector difference from a bitstream, and is able to find motion vector information for a current block using the motion vector predictor and the motion vector difference.

If a current coding block is coded using inter prediction, the identical/similar principle may apply to a transform block except that inter prediction is performed by a prediction block unit. Hence, in case of coding a current coding block using inter prediction, the current coding block is partitioned into at least one transform block by a quadtree scheme, transform coefficient information is obtained based on coded block indication information (e.g., cbf_luma, cbf_cb, cbf_cr) for each partitioned transform block, and a residual can be obtained by performing dequantization and inverse transform on the obtained transform coefficient information.

In case that a current coding block is coded in intra prediction mode, the decoder finds a prediction value for the current coding block by finding a prediction value by prediction block unit and/or is able to find a residual for the current coding block by finding a residual by transform block unit. The decoder can reconstruct the current coding block using the prediction value and/or residual for the current coding block.

Meanwhile, HEVC standard supports ultra high resolution (e.g., 4096×2160) video over 4K. In the ultra high resolution video over 4K, a homogeneous region may increase. Particularly, in case of a video having resolution over 8K (e.g., 8192×4320), a size of a homogeneous region may further increase in comparison with 4K video. Moreover, if resolution is raised despite that a scene inputted to a camera is intact, a block size of a region covered by CTU in existing resolution increases but a CTU size remains intact. Hence, it may bring an effect that a size (64×64) of an existing CTU decreases relatively. Hence, if a CTUS size greater than a CTU size (e.g., 64×64) supported by the existing HEVC standard is used, coding efficiency can be further raised.

For instance, if picture resolution increases to 8K from 4K, resolution indicating a specific region in a 4K video may increase quadruply. Hence, it may be advantageous to have 128×128 CTU like the ultra high resolution video over 4K. Yet, since a CTU size is limited to 64×64 in the HEVC standard for example, the corresponding CTU should be processed by being partitioned into 4 CTUs. As described above, since various syntax informations are basically provided for each CTU (e.g., refer to FIGS. 3, 5 and 6), if 4 64×64 CTUs are allocated for coding of a specific region, the number of bits for basic syntax informations my increase quadruply in comparison with a case of allocating a single 128×128 CTU. Therefore, it is very inefficient in aspect of coding efficiency.

As a method to solve such a technical problem, it is able to consider extending a CTU size. For instance, it is able to consider increasing a CTU size to 128×128. In this case, although coding efficiency may be raised, a CTU shape can be limitedly extended in a square manner only in considering compatibility with the existing HEVC standard. Depending on the property of a video, it may be advantageous that a CTU has a rectangular shape having one of width and height sizes greater than the other.

As a method for this, although a CTU (e.g., 128×64, 64×128) in rectangular shape can be considered, it has a limitation that it may be inefficient for another region in the same video. Particular, a square CTU may have an advantage for a specific region in the same video but a rectangular CTU may have an advantage for another region. Moreover, since a CTU is a basic processing unit of a video, if the CTU has a rectangular shape, a single picture is processed by being partitioned into rectangular blocks in predetermined size. Depending on a video, a square CTU or a rectangular CTU may have many effective regions. Hence, there is limitation that an effect obtainable from partitioning a basic processing unit into a rectangular shape cannot be guaranteed. Moreover, as described above, since a coding tree and a transform tree of a quadtree scheme are supported in case of the existing HEVC standard, a CTU in rectangular shape may have a problem of compatibility with the existing HEVC standard.

Accordingly, the present invention proposes a method of making a CTU shape flexible in the same video despite extending a CTU size.

CTU Merge Mode

An effect obtainable from extending a CTU size is to reduce the number of bits and improve coding efficiency, by preventing the overlap of syntax information basically provided for each CTU. Hence, if syntax information of a current CTU is derived from a neighbor CTU, it is able to obtain the same effect as extending a CTU size. Moreover, since a rectangle can be approximated into a plurality of contiguous squares, when syntax information is derived from a neighbor CTU, it is able to obtain the same effect as having a CTU in rectangular shape by referring to a left or upper neighbor CTU adjacent to a current CTU.

The present invention proposes to maintain a CTU in square shape and a CTU size (e.g., 16×16, 32×32, and 64×64) like the existing HEVC standard and to merge a current CTU with a neighbor CTU according to the picture property. Merging a current CTU with a neighbor CTU may mean that information of the current CTU is derived from the neighbor CTU instead of being transmitted through a bitstream. In the present specification, a scheme of deriving information of a current CTU from a neighbor CTU according to the present invention may be named a CTU merge mode.

In the CTU merge mode of the present invention, current CTU's information derived from a neighbor CTU may include syntax information signaled through a bitstream at a level equal to or smaller than CTU. And/or, the information of the current CTU may include parameter information used for encoding/decoding of the neighbor CTU. Deriving the information of the current CTU from the neighbor CTU may refer to setting the corresponding information of the neighbor CTU as the information of the current CTU.

For example, referring to FIG. 3, information derived from a neighbor CTU may include partition indication information (e.g., split_cu_flag) for a coded unit. As described above, a CTU is partitioned into coded units by a quadtree scheme based on partition indication information (e.g., split_cu_flag). Hence, since partition indication information for a current CTU is derived from partition indication information related to coded unit partition of a neighbor CTU, a coding quadtree of the current CTU may have the same structure of a coding quadtree of the neighbor CTU. Namely, in case of applying a CTU merge mode of the present invention, a current CTU can be partitioned into coded units having the same number, shape and structure of a neighbor CTU.

In case of applying a CTU merge mode, information on a coded unit included in a current CTU may be derived from a neighbor CTU. Hence, information of a current CTU having a CTU merge mode applied thereto may include information on a coded unit.

Particularly, information on a coded unit included in a current CTU may be derived from a coded unit corresponding to a neighbor CTU. Referring to FIG. 5, information derived from a corresponding coded unit of a neighbor CTU may include prediction mode information (e.g., pred_mode_flag), coded unit's partitioning mode (e.g., part_mode), information related to intra prediction mode (e.g., prev_intra_luma_pred_flag, mpm_idx, rem_intra_luma_pred_mode, intra_chroma_pred_mode), and information indicating a presence or non-presence of a transform tree (e.g., rqt_root_cbf). Moreover, in case of applying a CTU merge mode, since a partitioning mode (e.g., part_mode) for coded units is derived from a neighbor CTU, prediction units in a coded unit may be partitioned to have the same number and shape of prediction units of the neighbor unit. Or, an intra prediction mode may be derived from a neighbor CTU instead of intra mode prediction mode related information (e.g., prev_intra_luma_pred_flag, mpm_idx, rem_intra_luma_pred_mode, intra_chroma_pred_mode) in information of a current CTU.

Moreover, in case of applying a CTU merge mode, information for each prediction unit in a coded unit may be derived from a neighbor CTU. Particularly, information for a prediction unit included in a current CTU can be derived from a prediction unit corresponding to a neighbor CTU. For example, if a merge mode is applied to a specific prediction unit of a current CTU, information derived from a neighbor CTU may include merge indication information (e.g., merge_flag) for a corresponding prediction unit and merge index information (e.g., merge_idx). Moreover, for example, if a merge mode is not applied to a specific prediction unit of a current CTU, information derived from a neighbor CTU may include inter prediction parameter information (e.g., reference picture index information, motion vector information).

Similarly, if a CTU merge mode is applied, informations related to a transform tree or a transform unit in a current CTU may be derived from a neighbor CTU. For example, referring to FIG. 3 and FIG. 6, information for a transform unit derived from a neighbor CTU may include partition indication information (e.g., split_transform_flag), coded block indication information (e.g., cbf, cbf_luma, cbf_cb, and cbf_cr), and transform coefficient information. In this case, since partition indication information for a transform unit is derived from a neighbor CTU, a transform tree of a current CTU may have the same structure of a transform tree of the neighbor CTU.

For another example, although neighboring CTUs minutely differ from each other in texture, if a CTU merge mode is applied, it may be advantageous in reducing the number of bits for a current CTU. To this end, even if a CTU merge mode is applied, transform coefficient information related to residual data may be signaled through a bitstream instead of being derived from a neighbor CTU. In this case, the CTU may form a transform tree by deriving partition indication information (e.g., split_transform_flag) for a transform unit in the current CTU and obtain transform coefficient information for each transform unit from the bitstream.

If the transform coefficient information is obtained from the bitstream, it may be preferable that coded block indication information (e.g., cbf) for the corresponding transform block is signaled through the bitstream as well. Hence, although the CTU merge mode is applied, the transform coefficient information for each transform block and the coded block indication information can be signaled through the bitstream instead of being derived from the neighbor CTU.

For another example, although a CTU merge mode is applied, information (e.g., split_transform_flag, cbf, cbf_luma, cbf_cb, cbf_cr, transform coefficient information) related to a transform tree can be signaled through a bitstream instead of being derived from a neighbor CTU. In this case, since the current CTU and the neighbor CTU may have different transform tree structures, although neighboring CTUs may slightly differ from each other in texture, a CTU merge mode can be applied. Hence, as a CTU merge mode applied range can be extended, it may be advantageous for the bit number decrease and the coding efficiency increase. According to the present example, if the CTU merge mode is applied, the decoder can derive the information (e.g., coding tree in FIG. 3, refer to FIG. 5) related to the CTU and the coded unit from the neighbor CTU and obtain information (e.g., transform tree in FIG. 3, refer to FIG. 6) related to the transform tree from the bitstream.

Meanwhile, a CTU may not be partitioned into a coded unit according to partition indication information (e.g., split_cu_flag) for a coded unit. In this case, the CTU may have the same size of the coded unit. Moreover, if the corresponding coded unit is in merge skip mode, it may be similar to obtaining inter prediction parameter information (e.g., reference picture index information, motion vector information) of a current CTU from a neighbor CTU by performing the merge skip mode in CTU size. Yet, it is able to know whether a CTU is in the same size of a coded unit by obtaining partition indication information (e.g., split_cu_flag) for the CTU. On the contrary, in case of a CTU merge mode according to the present invention, as partition indication information (e.g., split_cu_flag) for a coded unit is even derived from a neighbor CTU, the number of bits can be reduced in comparison with a merge skip mode and coding efficiency can be improved.

Moreover, if a current CTU is not included in an intra slice, a merge skip mode is applicable. Particularly, only if a coded unit is not coded using intra prediction (or, coded using inter prediction), a merge skip mode is applicable. Hence, the merge skip mode is limitedly applicable in case that inter prediction is used. On the contrary, although a coded unit is coded using intra prediction, since related information is derived from a neighbor CTU, a CTU merge mode according to the present invention is applicable without being limited by a case of using inter prediction.

Syntax Information According to CTU Merge Mode

In order to support a CTU merge mode according to the present invention, the present invention proposes to signal CTU merge indication information and CTU merge index information through a bitstream. The CTU merge indication information and CTU merge index information of the present invention may be located before partition indication information (split_cu_flag) in the bitstream. Hence, before obtaining the partition indication information (split_cu_flag) for CTU, the decoder can obtain the CTU merge indication information and/or the CTU merge index information according to the present invention from the bitstream (e.g., refer to FIG. 3).

CTU merge indication information indicates whether a CTU merge mode of the present invention is applied to a current CTU, and may be referred to as ctu_merge_flag in the present specification. Particularly, CTU merge indication information may indicate whether information related to a current CTU is derived from a neighbor CTU. For example, if CTU merge indication information has a value of 1, it may indicate that information related to a current CTU is derived from a neighbor CTU. If CTU merge indication information has a value of 0, it may indicate that information related to a current CTU is not derived from a neighbor CTU. For another example, if CTU merge indication information has a value of 0, it indicates that information related to a current CTU is derived from a neighbor CTU. If CTU merge indication information has a value of 1, it indicates that information related to a current CTU is not derived from a neighbor CTU.

CTU merge indication information may be signaled in the first place within a current CTU. For example, referring to FIG. 3, CTU merge indication information may be signaled before split_cu_flag. Hence, the decoder obtains CTU merge indication information (e.g., ctu_merge_flag) for a current CTU from a bitstream, and may obtain information on the current CTU from the bitstream based on the CTU merge indication information or derive the information from a neighbor CTU. Particularly, if the CTU merge indication information indicates that the information of the current CTU is not derived from the neighbor CTU, the current CTU can be coded by performing the procedures described with reference to FIGS. 3 to 6. On the other hand, if the CTU merge indication information indicates that the information of the current CTU is derived from the neighbor CTU, the decoder may derive all information necessary for the decoding of the current CTU from the corresponding neighbor CTU, derive information on a coded unit included in the current CTU from the neighbor CTU and obtain information below a transform tree from the bitstream irrespective of the neighbor CTU, or obtain transform coefficient information of the current unit from the bitstream and derive the rest of the information of the current CTU from the neighbor CTU.

CTU merge index information indicates a candidate CTU to merge a current CTU among candidates including neighbor CTUs, and may be named ctu_merge_from_left_flag or ctu_merge_idx in the present specification. Particularly, CTU merge index information may indicate a specific merge candidate among merge candidates including neighbor CTUs, and information of a current CTU can be derived from the merge candidate indicated by the CTU merge index information. In the present specification, merge candidates including neighbor CTUs of a current CTU may be named a merge candidate list and a merge candidate indicated by CTU merge index information may be named a merge target CTU.

For example, in order to extend a CTU size into a rectangular shape, neighbor CTUs may include a left neighbor CTU and an upper neighbor CTU adjacent to a current CTU in the same picture of the current CTU. In this case, if CTU merge index information has a value of 1, it may indicate the left neighbor CTU. If CTU merge index information has a value of 0, it may indicate the upper neighbor CTU. Or, if CTU merge index information has a value of 0, it may indicate the left neighbor CTU. If CTU merge index information has a value of 1, it may indicate the upper neighbor CTU.

For another example, in order to extend a CTU into a freer shape and maximize coding efficiency improvement, neighbor CTUs may include a left neighbor CTU, an upper neighbor CTU, an upper-left neighbor CTU and an upper-right neighbor CTU, which are adjacent to a current CTU in the same picture of the current CTU, and may also include a CTU located at a position corresponding to the current CTU in a picture different from the picture including the current CTU. In this case, CTU merge index information may have an index value corresponding to a specific neighbor CTU or a merge candidate in a merge candidate list configured with the neighbor CTUs. For example, CTU merge index information may have values of 0 to 4.

Figure 7:
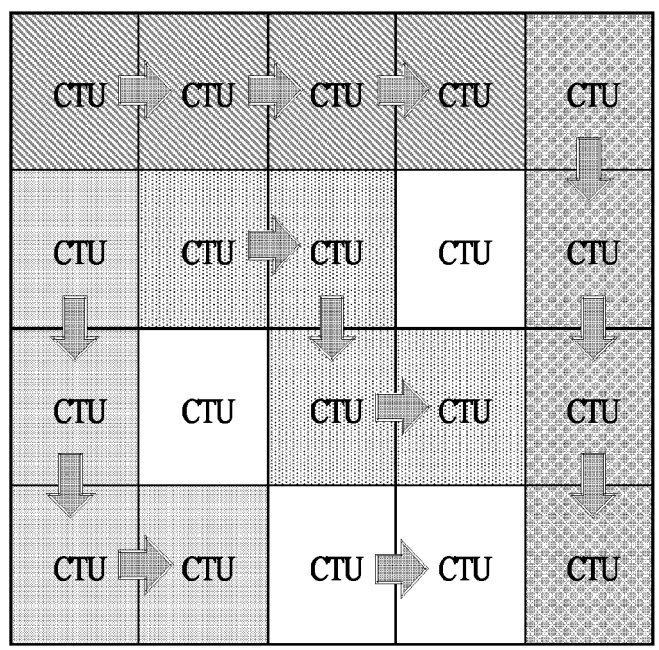
FIG. 7 illustrates an example that a CTU merge mode according to the present invention.

FIG. 7 shows one example that a CTU merge mode in accordance with the present invention. In the example of FIG. 7, a picture may include CTUs in the same size. In the example of FIG. 7, although it is illustrated that a single picture is configured with 25 (=5×5) CTUs, by which the present invention is non-limited. And, the present invention is equally/similarly applicable to a picture in random size.

Referring to FIG. 7, an arrow indicates a merge target CTU. A transverse arrow indicates that information of a current CTU is derived from a left neighbor CTU and a longitudinal arrow indicates that information of a current CTU is derived from an upper neighbor CTU. As shown in the example of FIG. 7, if a CTU merge mode of the present invention is applied, it will bring the same effect as supporting a CTU in width-long rectangular shape, a CTU in length-long rectangular shape, or a polygonal shape such as an L-shape or a zigzag shape. Therefore, in case of applying a CTU merge mode of the present invention, it will bring the same effect as supporting a CTU in flexible shape within the same video together.

Figure 8:
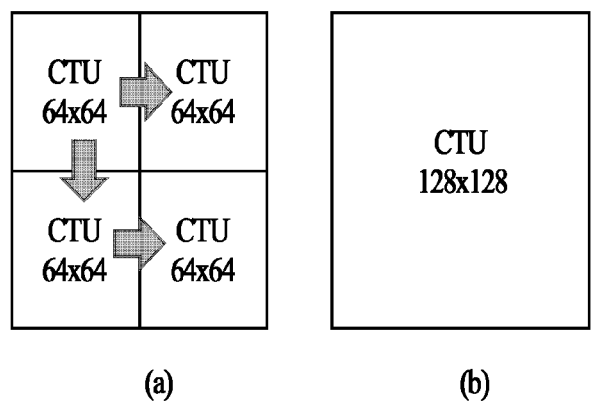
FIG. 8 illustrates a comparison of a CTU merge mode and a size-extended CTU according to the present invention

FIG. 8 shows comparison of a CTU merge mode according to the present invention and a size-extended CTU. FIG. 8 (a) shows one example of a CTU merge mode according to the present invention and FIG. 8 (b) shows one example of a size-extended CTU.

Referring to FIG. 8 (a), although CTU information is signaled through a bitstream in case of an upper-left CTU, information of an upper-light CTU, information of a lower-left CTU and information of a lower-right CTU may be derived from an upper-left CTU, an upper-left CTU and a lower-left CTU, respectively. Hence, since information for 3 64×64 CTUs can be derived from the upper-left CTU without being signaled through a bitstream, it may bring the same effect as signaling one CTU information for 128×128 through a bitstream. In case of using a CTU merge mode, it may bring the same effect as using 128×128 CTU.

Referring to FIG. 8 (b), as 128×128 CTU is used, it may be more efficient in aspect of transmission information but there is a disadvantage of being always limited to a CTU in square shape irrespective of video characteristics.

Meanwhile, it is highly probable that a CTU merge mode according to the present invention will be applied to a region having homogenous video characteristics. Moreover, if video characteristics are homogeneous, it is highly probable that CTU will not be partitioned into coded units. Hence, it is able to consider applying the CTU merge mode according to the present invention to a case that at least one of neighbor CTUs is not partitioned into coded units. If at least one of neighbor CTUs of a current CTU is not partitioned into coded units, CTU merge indication information (e.g., ctu_merge_flag) can be signaled through a bitstream. If all the neighbor CTUs of the current CTU are partitioned into coded units, the CTU merge indication information (e.g., ctu_merge_flag) is not signaled through the bitstream and a CTU merge mode does not apply the current CTU. Hence, if all of the neighbor CTUs of the current CTU are partitioned into coded units, the current CTU may be decoded by the procedures described with reference to FIGS. 3 to 6.

By determining whether to apply a CTU merge mode depending on whether to partition a neighbor CTU, the number of bits required for indicating a CTU merge mode can be reduced in case of not applying the CTU merge mode and the coding efficiency can be improved.

FIG. 9 shows one example of an embodiment of a CTU merge mode according to the present invention. A procedure shown in FIG. 9 may be performed before obtaining partition indication information (e.g., split_cu_flag) for a CTU (e.g., refer to FIG. 3).

Referring to FIG. 9, for example, a neighbor CTU may include a left neighbor CTU and an upper neighbor CTU adjacent to a current CTU in a picture including the current CTU. In this case, if the left or upper neighbor CTU is not partitioned into a plurality of coded units, CTU merge indication information (e.g., ctu_merge_flag) can be signaled through a bitstream. Hence, if the left or upper neighbor CTU is not partitioned into a plurality of coded units, the decoder may obtain the CTU merge indication information (e.g., ctu_merge_flag) for the current CTU from the bitstream.

On the contrary, if both of the left and upper neighbor CTUs are partitioned into a plurality of coded units, CTU merge indication information (e.g., ctu_merge_flag) is not signaled through a bitstream. Hence, if both of the left and upper neighbor CTUs are partitioned into a plurality of coded units, the decoder can decode the current CTU by the procedures shown in FIGS. 3, 5 and 6 without obtaining the CTU merge indication information (e.g., ctu_merge_flag) from the bitstream.

Moreover, when a neighbor CTU to merge with a current CTU is selected, if a left neighbor CTU is not partitioned into a plurality of coded units, a merge target CTU is determined as an upper neighbor CTU and information of the current CTU can be derived from the upper neighbor CTU. And/or, if the upper neighbor CTU is not partitioned into a plurality of coded units, a merge target CTU is determined as the left neighbor CTU and information of the current CTU can be derived from the left neighbor CTU.

And/or, if both of the left and upper neighbor CTUs are not partitioned into a plurality of coded units, CTU merge indication information (e.g., ctu_merge_flag) can be signaled through a bitstream. Hence, only if both of the left and upper neighbor CTUs are not partitioned into a plurality of coded units, by signaling CTU merge index information, the number of bits required for signaling the CTU merge index information can be reduced and the coding efficiency can be improved.

For another example, neighbor CTUs may include spatial neighbor CTUs including a left neighbor CTU adjacent to a current CTU, an upper neighbor CTU, an upper-left neighbor CTU, a lower-left neighbor CTU, and an upper-right neighbor CTU in a picture including the current CTU and a CTU located (or co-located) at a position corresponding to the current CTU in a picture different from the picture including the current CTU. In this case, if at least one of the neighbor CTUs is not partitioned into a plurality of coded units, it is able to derive information of the current block from a non-partitioned CTU without signaling CTU merge index information (e.g., ctu_merge_from_left_flag or ctu_merge_idx) through a bitstream. If two or more CTUs among the neighbor CTUs are not partitioned into coded units, CTU merge index information (e.g., ctu_merge_from_left_flag or ctu_merge_idx) can be signaled through a bitstream. And, it is able to derive the information of the current CTU from a neighbor CTU indicated by the CTU merge index information.

Figure 10:
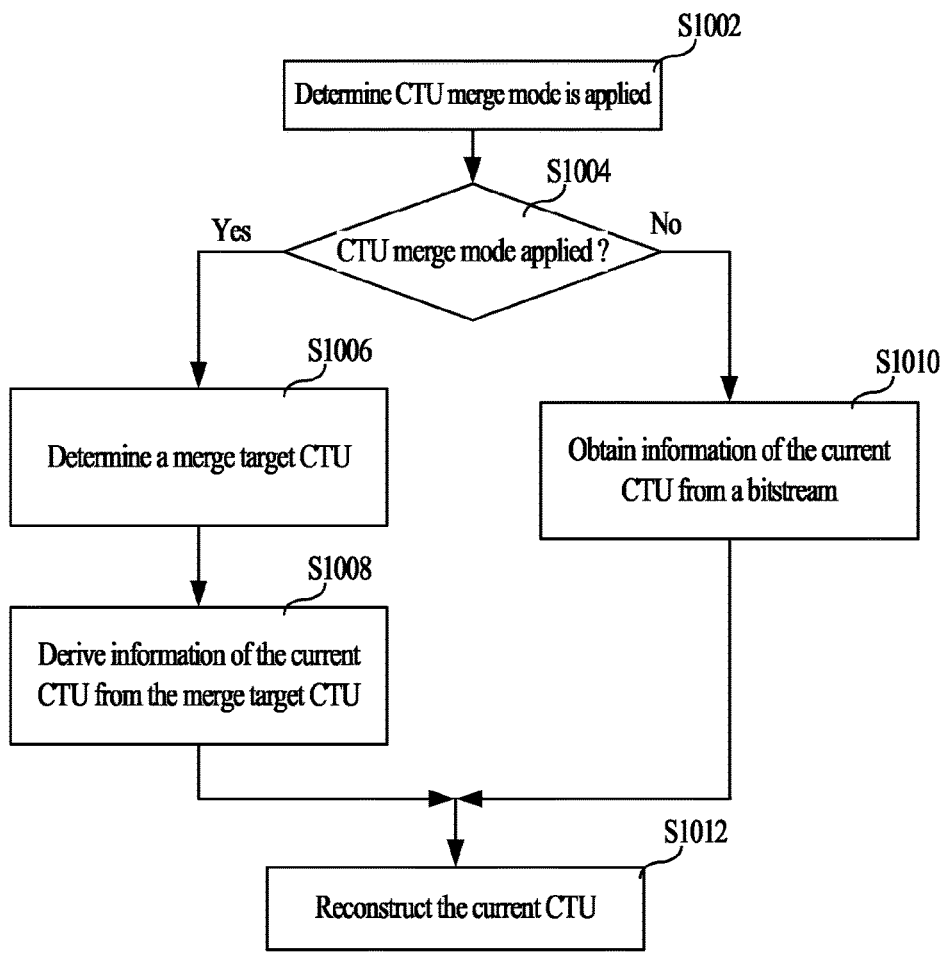
FIG. 10 illustrates a flowchart of a method according to the present invention.

FIG. 10 shows one example of a flowchart of a method according to the present invention.

A method exemplarily shown in FIG. 10 may be performed on a bitstream including at least one picture (or coded picture). A single picture may include at least one slice, and each slice may include a series of CTUs. Hence, a single picture may be partitioned into CTUs in the same size, and a picture can be processed by performing encoding/decoding by CTU unit. As described above, a size of CTU may be found from a sequence parameter set (SPS). After partitioning a picture into CTUs in the same size according to the CTU's size determined using the SPS, the method exemplarily shown in FIG. 10 can apply to each CTU.

For clarity, a current CTU may be named a current block, CTU merge indication information (e.g., ctu_merge_flag) may be named flag information, and CTU merge index information (e.g., ctu_merge_from_left_flag or ctu_merge_idx) may be named index information.

In a step S1002, it is able to determine whether a CTU merge mode is applied to a current CTU. For example, a decoder obtains CTU merge indication information (e.g., ctu_merge_flag) indicating whether the CTU merge mode is applied from a bitstream and then determines whether the CTU merge mode is applied based on the CTU merge indication information. For example, if the CTU merge indication information has a value of 1, it can indicate that the CTU merge mode is applied. If the CTU merge indication information has a value of 0, it can indicate that the CTU merge mode is not applied. The values of the CTU merge indication information may be switched to each other.

For another example, in the step S1002, based on whether at least one neighbor CTU adjacent to the current CTU in a picture including the current CTU is partitioned into a plurality of CUs, it is able to determine whether the CTU merge mode is applied. In particular, in the step S1002, the procedure described with reference to FIG. 9 can be performed.

In a step S1004, if the CTU merge mode is applied to the current CTU, the routine may go to a step S1006. If the CTU merge mode is not applied to the current CTU, the routine may go to a step S1012.

In the step S1006, it is able to determine a merge target CTU for the current CTU. In the present specification, a CTU for deriving information of the current CTU therefrom or a CTU indicated by the CTU merge index information may be named a merge target CTU. For example, the decoder may configure a merge candidate list including neighbor CTUs. The neighbor CTUs may include a left neighbor CTU and an upper neighbor CTU adjacent to the current CTU in the picture. Or, the neighbor CTUs may include a left neighbor CTU adjacent to the current CTU, an upper neighbor CTU, an upper-left neighbor CTU and an upper-right neighbor CTU in the picture including the current CTU and also may include a CTU located at a position corresponding to the current CTU in a picture different from the picture including the current CTU.

The decoder may obtain the CTU merge index information from the bitstream and determine a CTU indicated by the CTU merge index information in the merge candidate list as a merge target CTU.

Or, as described with reference to FIG. 9, it is able to determine a merge target CTU depending on whether a neighbor CTU is partitioned into a plurality of coded units. For detailed example, if a left neighbor CTU is partitioned into a plurality of CUs, a merge target CTU is determined as a right neighbor CTU and CTU merge indication information is not signaled through a bitstream. If a right neighbor CTU is partitioned into a plurality of CUs, a merge target CTU is determined as a left neighbor CTU and CTU merge indication information is not signaled through a bitstream. If the left neighbor CTU and the right neighbor CTU are not partitioned, CTU merge indication information is obtained from a bitstream and a merge candidate indicated by the CTU merge index information can be determined as a merge target CTU.

In a step S1008, information of the current CTU can be derived from the merge target CTU. For example, deriving the information of the current CTU may include setting information of the merge target CTU as the information of the current CTU. The information derived from the merge target CTU may include the information described with reference to FIGS. 3, 5 and 6. For instance, all information of the current CTU can be derived from the merge target CTU. For another example, information for CTU and CU in the current CTU can be derived from the merge target CTU. In this case, the informations exemplarily shown in FIG. 3 and FIG. 5 may be derived from the merge target CTU. For further example, the rest of information except transform coefficient information in the current CTU may be derived from the merge target CTU.

If the CTU merge mode is not applied, in a step S1010, information for the current CTU can be obtained from the bitstream. Particularly, the decoder may perform the procedures described with reference to FIGS. 3, 5 and 6 without applying the CTU merge mode.

In a step S1012, the decoder can reconstruct the current CTU based on information for the current CTU. As described above, if intra prediction is applied, a prediction value for each transform block is obtained based on an intra prediction mode, a residual for each transform block is obtained, and the current CTU can be then reconstructed. Moreover, if inter prediction is applied, a prediction value for each prediction block is obtained based on inter prediction parameter information, a residual for each transform block is obtained, and the current CTU can be then reconstructed.

As described in the foregoing description, CU is a unit for determining an intra or inter prediction mode, and the same intra or inter prediction mode may be applied within the CU. PU is a unit for performing inter prediction, and the same inter prediction parameter information (e.g., motion vector information, reference picture index information) may be applied within the PU. TU is a unit for performing transform, transform coefficient information is obtained by TU unit, and dequantization/inverse transform may be performed.

Figure 11:
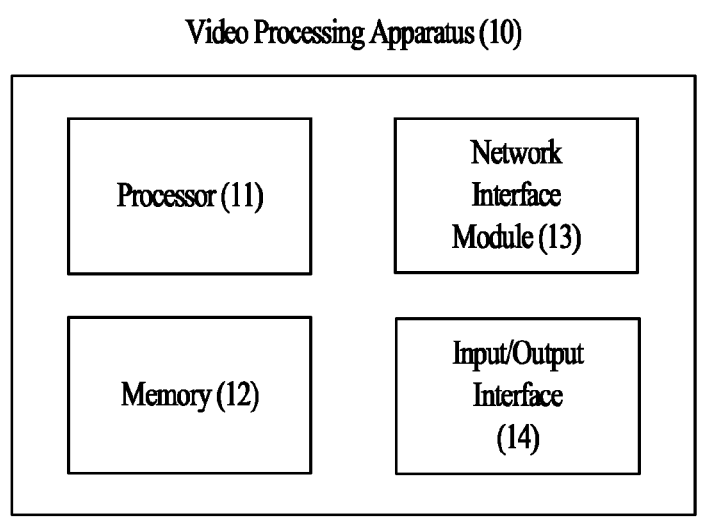
FIG. 11 illustrates a block diagram of a video processing apparatus to which the present invention can be applied.

FIG. 11 illustrates a block diagram to which the present invention can be applied. The video processing apparatus may include an encoding apparatus and/or a decoding apparatus of a video signal. For example, the video processing apparatus to which the present invention can be applied may include a mobile terminal such as a smart phone, a mobile equipment such as a laptop computer, a consumer electronics such as a digital TV, a digital video player, and etc.

A memory 12 may store program for processing and controlling by a processor 11, and may store a coded bitstream, a reconstructed image, control information, and the like. Further, the memory 12 may be used as a buffer for various video signals. The memory 12 may be implemented as a storage device such as a ROM (Read Only Memory), RAM (Random Access Memory), EPROM (Erasable Programmable Read Only Memory), EEPROM (Electrically Erasable Programmable Read-Only Memory), a flash memory, SRAM (Static RAM), HDD (Hard Disk Drive), SSD (Solid State Drive), and etc.

The processor 11 controls operations of each module in the video processing apparatus. The processor 11 may perform various control functions to perform encoding/decoding according to the present invention. The processor 11 may be referred to as a controller, a microcontroller, a microprocessor, a microcomputer, or etc. The processor 11 may be implemented as a hardware or a firmware, a software, or a combination thereof. When the present invention is implemented using a hardware, the processor 11 may comprise ASIC (application specific integrated circuit), DSP (digital signal processor), DSPD (digital signal processing device), PLD (programmable logic device), FPGA (field programmable gate array), or the like. Meanwhile, when the present invention is implemented using a firmware or a software, the firmware or software may comprise modules, procedures, or functions that perform functions or operations according to the present invention. The firmware or software configured to perform the present invention may be implemented in the processor 11 or may be stored in the memory 12 and executed by the processor 11.

In addition, the apparatus 10 may optionally include a network interface module (NIM) 13. The network interface module 13 may be operatively connected with the processor 11, and the processor 11 may control the network interface module 13 to transmit or receive wireless/wired signals carrying information, data, a signal, and/or a message through a wireless/wired network. For example, the network interface module 13 may support various communication standards such as IEEE 802 series, 3GPP LTE(-A), Wi-Fi, ATSC (Advanced Television System Committee), DVB (Digital Video Broadcasting), and etc, and may transmit and receive a video signal such as a coded bitstream and/or control information according to the corresponding communication standard. The network interface module 13 may not be included as necessary.

In addition, the apparatus 10 may optionally include an input/output interface 14. The input/output interface 14 may be operatively connected with the processor 11, and the processor 11 may control the input/output interface 14 to input or output a control signal and/or a data signal. For example, the input/output interface 14 may support specifications such as USB (Universal Serial Bus), Bluetooth, NFC (Near Field Communication), serial/parallel interface, DVI (Digital Visual Interface), HDMI (High Definition Multimedia Interface) so as to be connected with input devices such as a keyboard, a mouse, a touchpad, a camera and output devices such as a display.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention can be applied to a video processing apparatus such as a decoding apparatus or an encoding apparatus.

What is claimed is:
1. A method of decoding a bitstream for a video signal by a decoding apparatus, the method comprising:
    determining whether at least one neighbor block adjacent to a current block within a picture including the current block is partitioned into a plurality of coding blocks, the at least one neighbor block including a left neighbor block and an upper neighbor block adjacent to the current block;

when the at least one neighbor block is not partitioned, obtaining flag information from the bitstream, the flag information indicating whether parameter information for the current block is derived from one of the at least one neighbor block, and when the flag information indicates that the parameter information for the current block is derived from the at least one neighbor block, deriving the parameter information for the current block from a specific one of the at least one neighbor block;

when all of the at least one neighbor block is partitioned, obtaining the parameter information for the current block from the bitstream; and decoding the current block based on the parameter information for the current block.

2. The method of claim 1, wherein when the left neighbor block is partitioned, the specific neighbor block is determined as the right neighbor block.

3. The method of claim 1, wherein when the right neighbor block is partitioned, the specific neighbor block is determined as the left neighbor block.

4. The method of claim 1, further comprising:
obtaining index information indicating one of the at least one neighbor block from the bitstream when the left neighbor block and the right neighbor block are not partitioned,
wherein the specific neighbor block is determined as a block indicated by the index information among the at least one neighbor block.

5. The method of claim 1, wherein the at least one neighbor block further comprises upper-left and upper-right neighbor blocks adjacent to the current block within the picture including the current block and a block located at a position corresponding to the current block in a picture different from the picture including the current block.

6. The method of claim 5, further comprising:
obtaining index information indicating one of the at least one neighbor block from the bitstream when the flag information indicates that the parameter information for the current block is derived from the at least one neighbor block,
wherein the specific neighbor block is determined as a block indicated by the index information among the at least one neighbor block.

7. The method of claim 1, wherein the parameter information for the current block comprises information indicating whether the current block is partitioned into a plurality of coding blocks having a half horizontal size and a half vertical size, and information indicating whether the current block or each coding block included in the current block is coded in intra prediction mode or inter prediction mode.

8. The method of claim 1, wherein the parameter information for the current block comprises information related to an intra prediction mode for the current block or each coding block included in the current block.

9. The method of claim 1, wherein the parameter information for the current block comprises inter prediction parameter information for the current block or each prediction block included in the current block, and wherein the inter prediction parameter information comprises reference picture index information and motion vector information.

10. The method of claim 1, wherein, for the current block or each block included in the current block, decoding the current block comprises:
obtaining coded block flag information from the bitstream, the coded block flag information indicating whether a corresponding block includes a non-zero transform coefficient,
obtaining transform coefficient information for the corresponding block from the bitstream based on the coded block flag information, and
obtaining a residual for the corresponding block from the transform coefficient information.

11. The method of claim 1, wherein the picture comprises a plurality of blocks each of which has a same size as the current block, and wherein the method further comprises performing the steps for each of the plurality of blocks.

12. The method of claim 10, further comprising:
obtaining information indicating a minimum size of a coding block from the bitstream;
obtaining information indicating a difference between the minimum size of the coding block and a maximum size of the coding block from the bitstream; and
determining a size of the current block using the information indicating the minimum size of the coding block and the information indicating the difference.

13. The method of claim 1, wherein deriving the parameter information for the current block from the specific neighbor block includes
setting parameter information of the specific neighbor block as the parameter information for the current block.

14. The method of claim 1, wherein the coding block indicates a unit for applying a same intra prediction mode or inter prediction mode.

15. A decoding apparatus configured to decode a bitstream for a video signal, the decoding apparatus comprising:
a memory; and
a processor operatively connected to the memory, wherein the processor is configured to:
determine whether at least one neighbor block adjacent to a current block within a picture including the current block is partitioned into a plurality of coding blocks, the at least one neighbor block including a left neighbor block and an upper neighbor block adjacent to the current block;
when the at least one neighbor block is not partitioned, obtain flag information from the bitstream, the flag information indicating whether parameter information for the current block is derived from one of the at least one neighbor block, and
when the flag information indicates that the parameter information for the current block is derived from the at least one neighbor block, derive the parameter information for the current block from a specific one of the at least one neighbor block;
when all of the at least one neighbor block is partitioned, obtain the parameter information for the current block from the bitstream; and
decode the current block based on the parameter information for the current block.

* * * * *